United States Patent [19]

Bahr

[11] 3,862,677
[45] Jan. 28, 1975

[54] CLUTCH DISENGAGING AND BYPASSING ASSEMBLY

[76] Inventor: Norman G. Bahr, P.O. Box 1845, Grand Island, Nebr. 68801

[22] Filed: June 7, 1973

[21] Appl. No.: 367,899

[52] U.S. Cl............ 192/48.4, 192/48.8, 192/67 R, 74/572
[51] Int. Cl...................... F16d 11/04, F16d 47/02
[58] Field of Search ....... 192/48.1, 48.3, 48.4, 48.5, 192/48.8, 53 B, 67 R, 96; 74/572

[56] References Cited
UNITED STATES PATENTS

| 575,620 | 1/1897 | Seymour | 192/67 R |
|---|---|---|---|
| 1,998,172 | 4/1935 | Ross | 192/53 B |
| 2,642,970 | 6/1953 | Szekely | 192/67 R |
| 2,723,572 | 11/1955 | Bornzin | 74/572 |
| 2,730,019 | 1/1956 | Christman | 192/48.5 X |
| 2,841,454 | 7/1958 | Cheramie | 192/67 R X |
| 2,953,935 | 9/1960 | Malk et al. | 192/53 B X |
| 3,265,173 | 8/1966 | Russell | 192/67 R |

Primary Examiner—Allan D. Herrmann
Attorney, Agent, or Firm—Sherman & Shalloway

[57] ABSTRACT

A clutch disengaging and bypassing assembly including a shaft slidable between clutch engaged and clutch disengaged positions and carrying a floating coupling for coupling an input coupling sleeve rotated by an input driving shaft with the clutch, the floating coupling transmitting rotation of the input coupling sleeve to the clutch and the clutch being splined to the slidable shaft when the shaft is in the clutch engaged position and an input end of the shaft being splined to the input coupling sleeve, the floating coupling disengaging the clutch and a splined portion of the shaft disengaging the clutch when the shaft is in the clutch disengaged position such that the clutch is completely bypassed and disengaged from the drive train.

8 Claims, 2 Drawing Figures

CLUTCH DISENGAGING AND BYPASSING ASSEMBLY

BACKGROUND OF THE INVENTION

1. Field of the Invention

The present invention pertains to clutch assemblies and, more particularly, to assemblies for selectively disengaging and bypassing a clutch assembly in a drive train.

2. Discussion of the Prior Art

Clutch assemblies, normally including heavy flywheels, are conventionally utilized in drive trains to selectively impart the rotation of an input shaft driven by a combustion engine or other motive means to a driven output shaft. When the torque of the input shaft is varied, such drive trains require continual acceleration and deceleration of the heavy clutch assembly thereby providing the disadvantage of a torque drain on the drive trains. The wasted torque required for movement of a heavy clutch assembly including a flywheel represents a substantial loss of power in vehicles, such as automobiles and trucks.

The prior art, as exemplified by U.S. Pat. Nos. 2,319,784, 3,018,383 and 3,491,864, has utilized various mechanisms to disengage portions of clutch assemblies; however, such prior art attempts have not been successful in disengaging and bypassing the bulk of the rotating weight of clutch assemblies. Accordingly, the prior art has not overcome the disadvantages of wasted torque and loss of drive power in rotating heavy clutch assemblies or portions thereof, most notably, the heavy flywheel.

SUMMARY OF THE INVENTION

Accordingly, it is a primary object of the present invention to provide a clutch disengagement and bypass assembly overcoming the above-mentioned disadvantages of the prior art to selectively reduce the weight of a clutch assembly in a drive train.

Another object of the present invention is to construct a clutch disengagement and bypass assembly for conserving torque from a driving input shaft to a driven output shaft.

The present invention has a further object in permitting selective adaptation of a drive train for high or low torque requirements by bypassing and disengaging a heavy clutch assembly.

An additional object of the present invention is to utilize an axially slidable shaft for directly transmitting rotation of an input shaft to an output shaft when a clutch assembly is disengaged from the drive train.

Yet another object of the present invention is to utilize a floating splined coupling on a slidable shaft to transmit rotation from an input coupling sleeve to a clutch assembly and, upon sliding of the shaft, to disengage the clutch assembly from the input coupling sleeve.

Some of the advantages of the present invention over the prior art are that the clutch assembly is completely disengaged from the drive train and bypassed by the axially slidable shaft to reduce drive torque required and the clutch disengaging and bypassing assembly of the present invention is simple in nature with relatively few components and, therefore, easy and inexpensive to manufacture and install.

The present invention is generally characterized in an assembly for disengaging and bypassing a clutch assembly for transmitting rotation of an input shaft to an output shaft, the assembly comprising a rotatable, axially slidable shaft having input and output ends, and carrying first engaging means at the input end and second engaging means for coupling the slidable shaft with the clutch assembly, output coupling means coupling the output end of the slidable shaft to the output shaft, input coupling means rotatable with the input shaft carrying third engaging means for engaging the slidable shaft, floating coupling means carried by the slidable shaft for coupling the input coupling means with the clutch assembly, and means for selectively sliding the slidable shaft between a clutch engaged position and a clutch disengaged position, the second engaging means being coupled with the clutch assembly and the floating coupling means coupling the input coupling means with the clutch assembly when the slidable shaft is in the clutch engaged position, and the first engaging means carried by the slidable shaft engaging the third engaging means carried by the input coupling means, the floating coupling means disengaging the clutch assembly and the second engaging means carried by the slidable shaft disengaging the clutch assembly when the slidable shaft is in the disengaged position whereby the clutch assembly is bypassed when the slidable shaft is in the clutch disengaged position and does not rotate with the slidable shaft.

Other objects and advantages of the present invention will become apparent from the following description of the preferred embodiments taken in conjunction with the accompanying drawings.

DESCRIPTION OF THE PREFERRED EMBODIMENT

Figure 1:
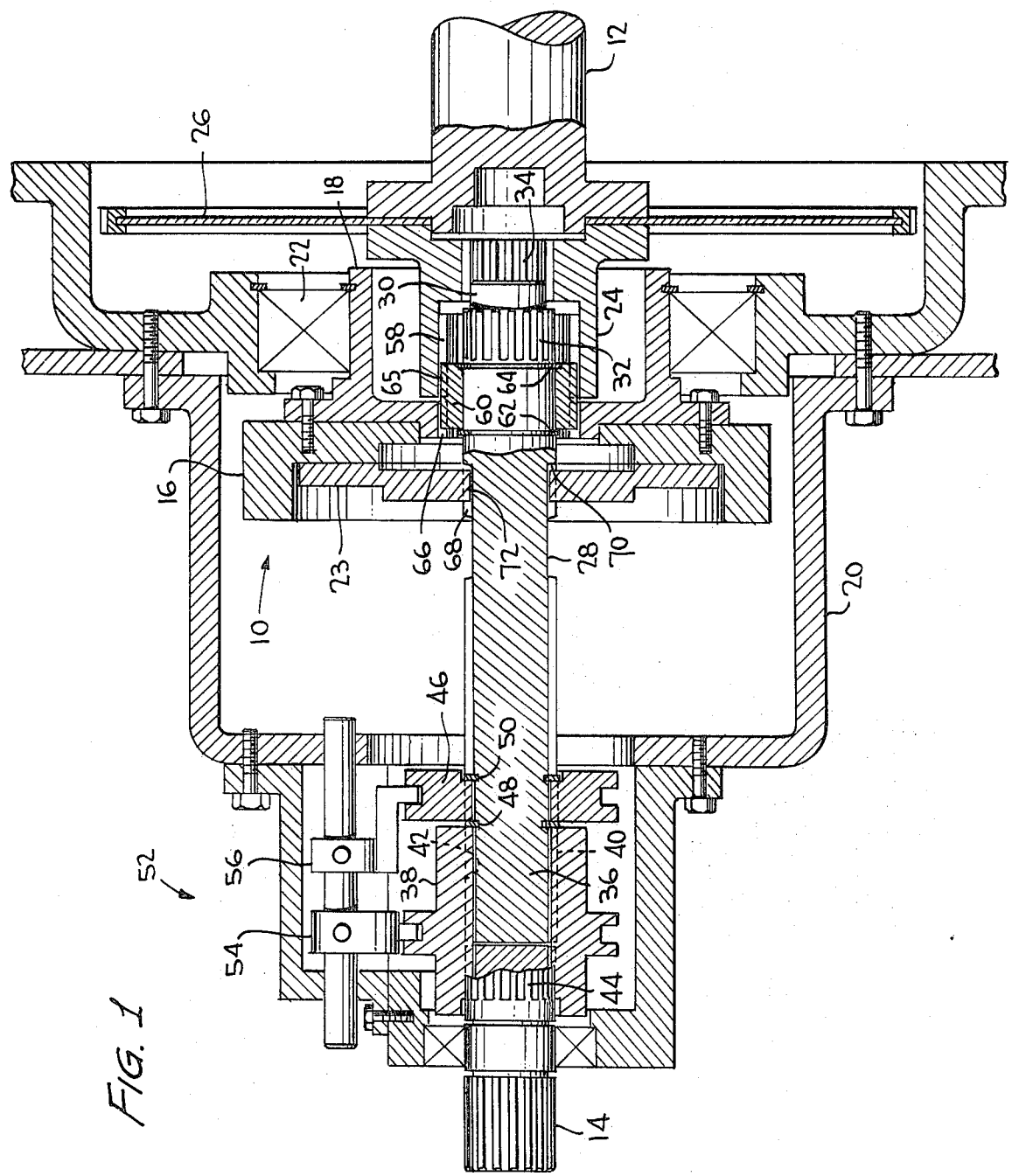
FIG. 1 is a longitudinal section of a clutch disengaging and bypassing assembly according to the present invention in the clutch engaged position.
Figure 2:
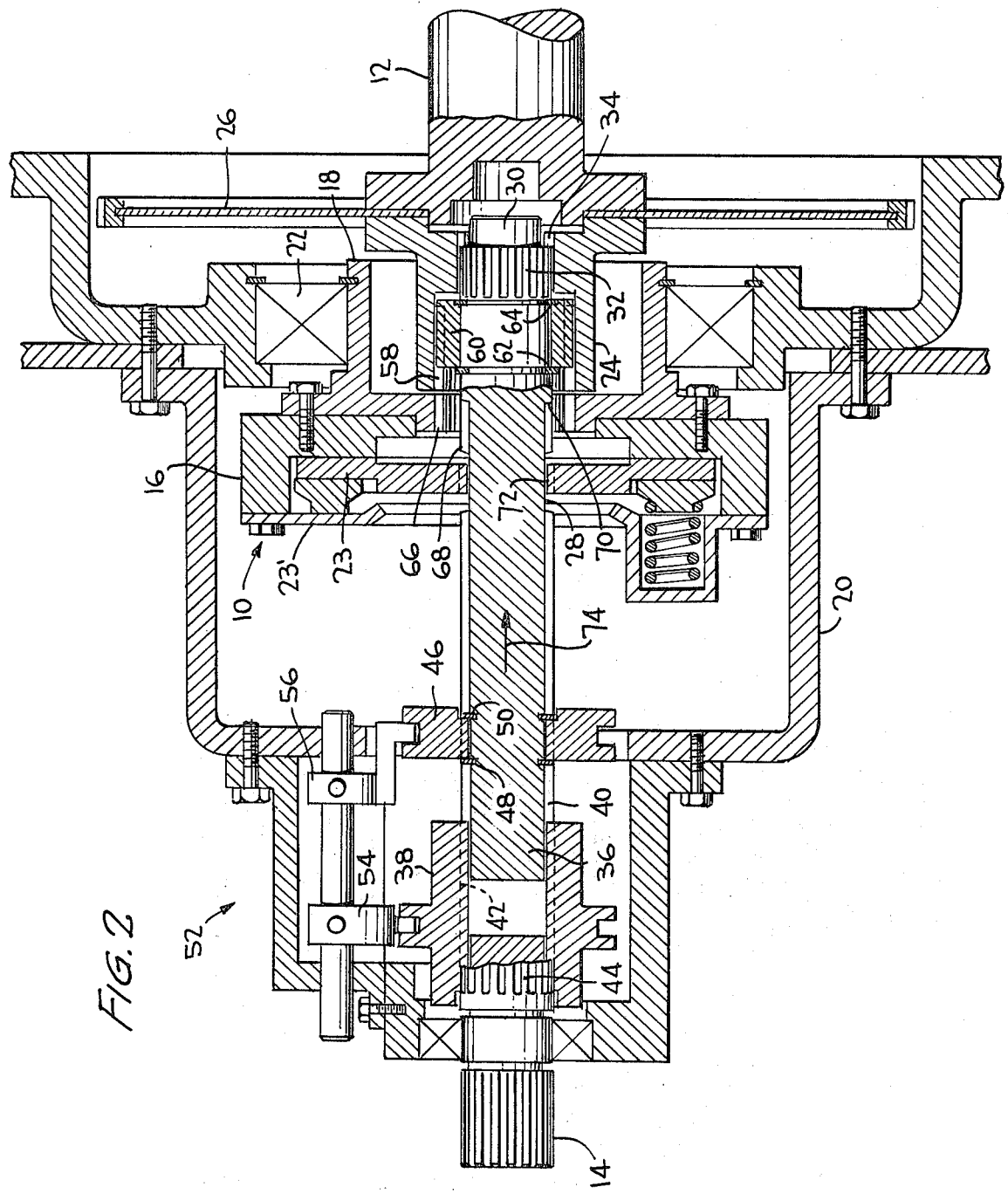
FIG. 2 is a longitudinal section of the clutch disengaging and bypassing assembly of FIG. 1 in the clutch disengaged position.

The clutch disengaging and bypassing assembly of the present invention is illustrated in FIGS. 1 and 2 in the clutch engaged and clutch disengaged positions, respectively, the assembly being utilized to selectively disengage a clutch assembly 10 which transmits rotation of a driving input shaft 12, such as the crank shaft of a combustion engine utilized in automotive vehicles, and an output shaft 14, such as the drive shaft for such automotive vehicles. The clutch assembly 10 includes a flywheel 16 bolted to a bearing member 18 which is rotatably mounted in a clutch housing 20 by a bearing 22 and a clutch plate 23 movable to engage the flywheel 16 under the action of a pressure plate, 23' as shown in FIG. 2, as is conventional. A lightweight input coupling sleeve 24 is bolted to input shaft 12 for rotation therewith, and a starting gear 26 is secured between flanges of the input shaft 12 and the input coupling sleeve 24 for initial starting of the combustion engine, as is conventional.

In accordance with the clutch disengaging and bypassing assembly of the present invention, a slidable shaft 28 is rotatably mounted in coaxial alignment with the clutch assembly 10 and has an input end 30 carrying external splines 32 adapted to mesh with internal splines 34 in the input coupling sleeve 24 when the slidable shaft 28 is axially moved to the clutch disengaged position and an output end 36 coupled to output shaft 14 by means of a slidable output coupling 38, the output end 36 carrying external splines 40 meshing with internal splines 42 in the output coupling 38, which splines 42 also mesh with external splines 44 carried on the end of output shaft 14. A ring 46 is rotatably mounted on shaft 28 in a fixed longitudinal position relative thereto by means of split retaining rings 48 and 50, and a lever and fork mechanism 52 includes a pair of actuating members 54 and 56 operating coupling 38 and ring 46, respectively, such that movement of levers, not shown, connected with the actuating members 54 and 56 moves the coupling 38 and ring 46 along the longitudinal axis of shaft 28.

Input coupling sleeve 24 is formed with a cylindrical wall having internal splines 58 spaced from shaft 28, and a floating coupling 60, in the form of a splined ring rotatably mounted on the shaft 28 and longitudinally fixed for sliding movement therewith by split retaining rings 62 and 64, has external splines 65 meshing with splines 58 in input coupling sleeve 24 and has an axial dimension to further mesh with internal splines 66 in bearing member 18 of the clutch assembly 10. The shaft 28 extends centrally through the clutch plate 23 and carries external splines 68 adjacent a shoulder 70 meshing with internal splines 72 in the clutch plate 23, the shoulder 70 acting as a stop to limit axial movement of the shaft 28 toward the output shaft 14.

In operation, when the clutch disengaging and bypassing assembly is in the clutch engaged position illustrated in FIG. 1, rotation of the input shaft 12 and the input coupling sleeve 24 bolted thereto is imparted to the shaft 28 by means of the splined interconnection provided by floating coupling 60 and the meshing of splines 68 and 72 between the clutch plate 23 and the shaft 28, the rotation of sleeve 24 being imparted to clutch assembly 10 through floating coupling 60 and the rotation of clutch assembly 10 being imparted to shaft 28 by clutch plate 23. The output coupling 38 meshes with the output end 36 of shaft 28 and the output shaft 14 to impart rotation to the output shaft; and, thus, in the clutch engaged position, the clutch assembly 10, including the heavy flywheel 16, is rotated along with the rotation of shaft 28.

In order to place the clutch disengaging and bypassing assembly in the clutch disengaged position illustrated in FIG. 2, the lever controlling actuating member 56 is operated to slide ring 46 in the direction of arrow 74, the movement of ring 46 causing the shaft 28 to slide axially toward the input shaft 12. As the shaft 28 is moved, splines 32 carried by the shaft 28 mesh with splines 34 in input coupling sleeve 24 while floating coupling 60 still connects input coupling sleeve 24 with the clutch assembly 10 and splines 68 and 72 still mesh to connect the clutch assembly 10 to the shaft 28. Accordingly, the rotation of shaft 28 is synchronized with rotation of input coupling sleeve 24 to permit meshing of the splines 32 and 34 without grinding in that the axial movement required of shaft 28 for meshing of splines 32 and 34 is less than the axial movement required to disengage the splines 65 of floating coupling 60 from splines 66 in the bearing member 18 of the clutch assembly 10 and the axial movement required to disengage splines 68 on shaft 28 from splines 62 in clutch plate 23. As the shaft 28 is further moved to the clutch disengaged position illustrated, the splines 65 of floating coupling 60 will disengage splines 66, and the splines 68 on shaft 28 will disengage splines 72 such that the clutch assembly 10 will be floating with respect to the shaft 28 and not rotated with the drive train in that shaft 28 will be directly driven by the meshing of splines 32 at the input end 30 with splines 34 in input coupling sleeve 24. Accordingly, the input shaft 12 will directly drive the output shaft 14 through only input coupling sleeve 24, shaft 28 and output coupling 38 thereby substantially reducing torque output by obviating the requirement that the heavy clutch assembly 10 be rotated with the drive. If, with the assembly in the clutch disengaged position illustrated in FIG. 2, it is desired to discontinue drive from input shaft 12 to output shaft 14, such function being normally provided by releasing the clutch assembly 10, the actuating member 54 may be moved by a lever, not shown, to slide coupling 38 in the direction of arrow 74 thereby disengaging splines 42 and 44 to decouple shaft 28 from output shaft 14.

From the above, it can be seen that the clutch disengaging and bypassing assembly of the present invention permits operation of a vehicle or other motor driven machine with either light or heavy clutch assemblies thereby permitting selection adaptation of the drive train for high torque or low torque requirements. Consequently, with the assembly in the clutch disengaged position, continual acceleration and deceleration of the heavy clutch assembly 10 is obviated when the torque of the input drive shaft 12 is varied.

The clutch disengaging and bypassing assembly of the present invention can be utilized with any conventional clutch assembly; and, thus, clutch assembly 10 has not been described in detail, the structure and function thereof being well known. For example, the clutch assembly can include a pressure plate No. 360-215-R91, a clutch plate No. 375-701-R91 and a flywheel No. 359-895-R91 produced by International Harvester with the flywheel re-machined to cooperate with the floating coupling 60.

Inasmuch as the present invention is subject to many variations, modifications and changes in detail, it is intended that all subject matter described above or shown in the accompanying drawings be interpreted as illustrative and not in a limiting sense.

What is claimed is:

1. An assembly for disengaging and bypassing a clutch assembly for transmitting rotation of an input shaft to an output shaft, the assembly comprising
   a rotatable, axially slidable shaft having input and output ends, and carrying first engaging means at said input end and second engaging means for coupling said slidable shaft with the clutch assembly;
   output coupling means coupling said output end of said slidable shaft to the output shaft;
   input coupling means rotatable with the input shaft carrying third engaging means for engaging said slidable shaft;
   floating coupling means carried by said slidable shaft for coupling said input coupling means with the clutch assembly; and
   means for selectively sliding said slidable shaft between a clutch engaged position and a clutch disengaged position, said second engaging means being coupled with said clutch assembly and said floating coupling means coupling said input coupling means with the clutch assembly when said slidable shaft is in said clutch engaged position, and said first engaging means carried by said slidable shaft engaging said third engaging means carried by said input coupling means, said floating coupling means disengaging the clutch assembly and said second engaging means carried by said slidable shaft disengaging the clutch assembly when said slidable shaft is in said disengaged position whereby the clutch assembly is bypassed when said slidable shaft is in said clutch disengaged position and does not rotate with said slidable shaft.

2. An assembly as recited in claim 1 wherein said floating coupling means is a splined ring rotatably mounted on said slidable shaft and longitudinally fixed thereto for sliding movement with said slidable shaft.

3. An assembly as recited in claim 2 wherein said means for selectively sliding said slidable shaft includes a ring rotatably mounted on said slidable shaft and longitudinally fixed thereto.

4. An assembly as recited in claim 3 and further comprising means for selectively disengaging said output coupling means from the output shaft when said slidable shaft is in said clutch disengaged position.

5. An assembly as recited in claim 1 and further comprising means for selectively disengaging said output coupling means from the output shaft when said slidable shaft is in said clutch disengaged position.

6. An assembly for transmitting rotation of an input shaft to an output shaft comprising
a clutch assembly having a rotatable flywheel and clutch plate;
a rotatable, axially slidable shaft extending centrally through said clutch assembly and having a splined input end, an output end and a splined portion for engaging said clutch plate;
an output coupling engaging said output end of said slidable shaft and the output shaft to transmit rotation from said slidable shaft to the output shaft;
an input coupling sleeve secured to the input shaft and rotatable therewith and having a first splined portion for engaging said splined input end of said slidable shaft and a second splined portion;
a floating splined coupling rotatably mounted on said slidable shaft and longitudinally fixed thereto for sliding movement with said slidable shaft, said floating coupling engaging said second splined portion of said input coupling sleeve for selectively coupling said input coupling sleeve with said flywheel; and
means for selectively sliding said slidable shaft between a clutch engaged position wherein said floating coupling couples said input coupling sleeve with said flywheel for rotation therewith and said splined portion of said slidable shaft engages said clutch plate and a clutch disengaged position wherein said splined input end of said slidable shaft engages said first splined portion of said input coupling sleeve, said floating coupling disengages said flywheel and said splined portion of said slidable shaft disengages said clutch plate whereby the clutch assembly is bypassed when said slidable shaft is in said clutch disengaged position with rotation of the input shaft transmitted to the output shaft through said input coupling sleeve, said slidable shaft and said output coupling.

7. An assembly as recited in claim 6 wherein said output coupling is splined to said output end of said slidable shaft and axially slidable relative thereto.

8. An assembly as recited in claim 7 and further comprising means for selectively sliding said output coupling along said slidable shaft when said slidable shaft is in said clutch disengaged position.

* * * * *